United States Patent [19]

McNeely

[11] Patent Number: 4,501,063

[45] Date of Patent: Feb. 26, 1985

[54] STYLUS ARM INSERTION APPARATUS

[75] Inventor: Ronald K. McNeely, Indianapolis, Ind.

[73] Assignee: RCA Corporation, New York, N.Y.

[21] Appl. No.: 509,093

[22] Filed: Jun. 29, 1983

[51] Int. Cl.³ .............................................. B23P 21/00
[52] U.S. Cl. ........................................ 29/711; 29/744; 29/823; 369/170; 221/238; 414/224
[58] Field of Search ................. 198/485, 690; 406/76; 414/224, 225; 221/225, 238; 29/700, 711, 719, 744, 823

[56] References Cited

U.S. PATENT DOCUMENTS

| | | | |
|---|---|---|---|
| 1,953,757 | 4/1934 | Hessenbruch | 406/76 X |
| 2,808,691 | 10/1957 | Moore | 221/238 X |
| 3,239,079 | 3/1966 | Leavesley, Jr. et al. | 414/225 X |
| 3,250,375 | 5/1966 | Bonthius et al. | 198/485 X |
| 3,289,861 | 12/1966 | Carle et al. | 221/225 X |
| 3,344,370 | 9/1967 | Sewell | 29/509 X |
| 3,589,512 | 6/1971 | Schaaf | 209/73 |
| 4,094,410 | 6/1978 | Fegley et al. | 209/73 |
| 4,404,670 | 9/1983 | Taylor | 369/170 |
| 4,466,555 | 8/1984 | Yarnitsky et al. | 221/238 X |

FOREIGN PATENT DOCUMENTS

| | | | |
|---|---|---|---|
| 149179 | 11/1979 | Japan | 198/485 |
| 37930 | 4/1981 | Japan | 414/224 |

Primary Examiner—Carl E. Hall
Assistant Examiner—John Burtch
Attorney, Agent, or Firm—Paul J. Rasmussen; William H. Meise; Dilip A. Kulkarni

[57] ABSTRACT

The magnet insertion apparatus includes a first passageway along which magnets are fed. Arranged in communication with the first passageway, and at right angles to it, is a second passageway. A transport blade, reciprocably mounted in the second passageway, displaces the leading magnet to a position in a third passageway disposed parallel to and offset from the first passageway. A drive rod, reciprocably mounted in the third passageway pushes the magnet into a stylus arm held in alignment with the third passageway. According to a further aspect of the invention, the third passageway is provided with a guideway for accurately guiding the magnets. The insertion machine is additionally equipped with a reciprocably-mounted tucking element to tuck the magnets into the guideway.

20 Claims, 4 Drawing Figures

STYLUS ARM INSERTION APPARATUS

This invention relates to an automatic assembly machine, and more particularly, it pertains to a machine for inserting tiny magnets into a stylus arm.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the abovementioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed. The microscopic groove geometries require a stylus that has rather fine dimensions (e.g., tip width—2 micrometers).

The pickup stylus is typically housed in a protective cartridge. The stylus is disposed at one end of a stylus holder, which is, in turn, attached to the free end of a light weight stylus arm. Typically, the stylus arm is in the form of a hollow aluminum tube with the following dimensions: length=1.654 inches, outside diameter=0.044 inches, and wall thickness=0.002 inches. The other end of the stylus arm is suspended in a cartridge housing by a thin rubber suspension, about 0.015 inches thick. The stylus arm is held inside the cartridge housing in its stored position by a pair of retaining fingers. A leaf spring (or a flylead) has one end secured to the stylus, and its other end to the cartridge housing. The flylead provides the stylus/record engagement force, and also serves as the electrical connection between the stylus and the signal processing circuits of a video disc player. (Refer to U.S. patent application, Ser. No. 363,392, of Taylor.)

The stylus cartridge is inserted into a carriage translatably mounted in the video disc player. When the cartridge is thus installed in the carriage, the stylus arm retaining fingers are automatically spread apart to release the stylus arm. The stylus arm rests on a stylus arm support bracket when freed from the cartridge retaining fingers. The bottom wall of the carriage has an opening through which the stylus is selectively lowered onto a turntable-supported record for playback. The carriage is driven to cause it to follow the radially inward motion of the groove-guided stylus.

Disposed in the carriage are a number of stylus arm control mechanisms. The stylus arm lifting/lowering mechanism serves to selectively lower the stylus onto the disc for playback, and then raise it back up into the cartridge for storage. (Refer to U.S. patent application, Ser. No. 449,314, of Brauer.) A groove skipper mechanism, housed in the carriage, comprises a tiny permanent magnet mounted on the stylus arm at right angles to it, and an electromagnet located in the carriage near the skipper magnet. The groove skipper mechanism, when activated, serves to kick the stylus sideways, for example, to cause the stylus to skip ahead or back. (See U.S. Pat. No. 4,258,233 issued to Simshauser.) Further mounted in the carriage is an armstretcher mechanism including another small permanent magnet having identical dimensions as the skipper magnet and disposed axially inside the stylus arm tube, and an electromagnet located in the carriage adjacent to it. When signals are applied to the armstretcher electromagnet, it produces magnetic fields which interact with the stylus arm-mounted transducer magnet to cause front-to-back motion of the stylus arm in a manner opposing the cyclical errors in the stylus/record relative velocity during playback. (Refer to U.S. patent application, Ser. No. 366,644, of Taylor et al.) The kicker and transducer magnets are relatively small—length=0.130 inches and cross-section=0.025×0.025 square inches.

The small dimensions of the parts involved make the assembly of the two magnets to the stylus arm very cumbersome and difficult. It is desirable to provide an apparatus for inserting the two magnets into the stylus arm quickly, accurately and reliably.

The magnet insertion machine, according to the subject invention, includes a first passageway along which the magnets are fed sequentially. In communication with the first passageway, and substantially at right angles to it, is a second passageway. The second passageway is equipped with an abutment against which the magnets in the first passageway are fed one at a time. Arranged substantially orthogonally to the second passageway, and substantially parallel to and spaced from the first passageway, is a third passageway. Reciprocably mounted in the second passageway is a transfer element which, when advanced, transports the leading magnet in engagement with the abutment to a position against a reference surface in the third passageway. A drive element, reciprocably mounted in the third passageway, pushes the magnet in the third passageway into a stylus arm aligned therewith.

In accordance with a further feature of the invention, the insertion apparatus has two sets of passageways for respectively inserting the transducer and kicker magnets into the stylus arm.

According to an additional aspect of the invention, the third passageway is equipped with an offset guideway for guiding the magnets into the stylus arm. The insertion apparatus further includes a reciprocably-mounted locating element for accurately tucking the magnets into the guideway.

Pursuant to still another feature of the invention, the abutment and reference surfaces are provided with magnetic properties to properly position the magnets with respect to the second and third passageways.

In pursuance of a further feature of the invention, the transfer and drive elements are also provided with magnetic properties to ensure that the magnets continue to remain properly oriented during transfer and insertion operations.

Figure 1:
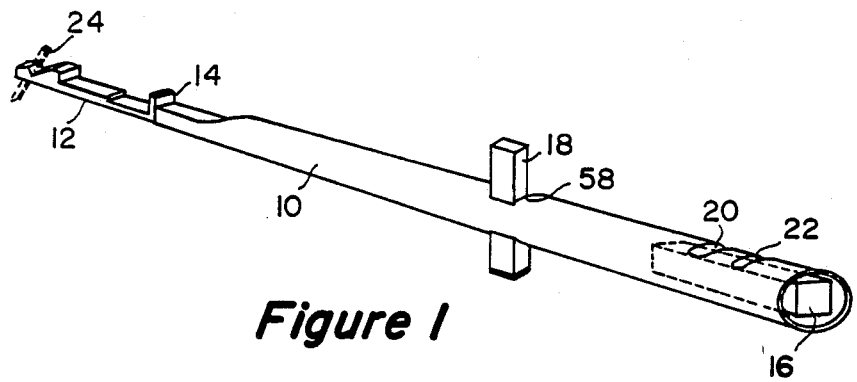
FIG. 1 is a greatly enlarged, perspective view of a stylus arm assembly including the stylus arm having the axial and perpendicular magnets installed therein in accordance with the present invention.

FIG. 1 shows a lightweight stylus arm 10 having a plastic stylus holder 12 disposed at the free end thereof. The stylus arm 10 is in the form of a hollow aluminum tube having the following dimensions—length = 1.654 inches, outside diameter = 0.044 inches and tube thickness = 0.002 inches. The plastic stylus holder 12 is made from polypropylene material, and has these dimensions in inches: length = 0.275, width = 0.035 to 0.045 and thickness = 0.015. To secure the stylus holder 12 to the stylus arm 10, it is inserted into the hollow stylus arm tube to the point where an extension 14 on the holder juts against the free end of the stylus arm, and then the end of the stylus arm is crimped to firmly secure the stylus holder in place.

Disposed near the pivoted end of the stylus arm 10 are an axially-mounted armstretcher magnet 16 and a perpendicularly-mounted skipper magnet 18. The stylus arm 10 is lanced to provide a pair of depressions 20 and 22 therein to fixedly secure the axial magnet 16 in place upon insertion. To install the perpendicular magnet 18, the stylus arm 10 is pierced to provide an aperture 58 therein, into which the kicker magnet 18 is press fitted. Both the axial and perpendicular magnets 16 and 18 have the same overall dimensions—$0.025 \times 0.025 \times 0.130$ inches.

After the installation of the stylus holder 12 and the two magnets 16 and 18 to the stylus arm 10, a stylus 24, shown in phantom, is inserted into the plastic stylus holder. The stylus dimensions are approximately $0.004 \times 0.010 \times 0.070$ inches. The attachment of the stylus 24 to the stylus holder 12 is done at a later stage, and is not a part of this invention.

Figure 4:
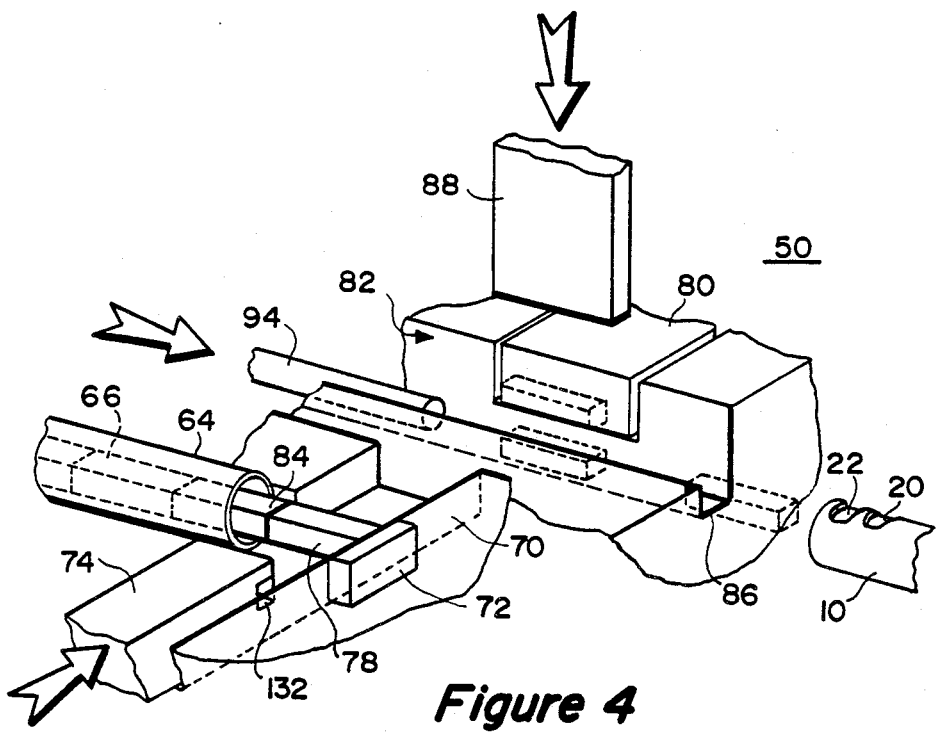
FIG. 4 illustrates the details of the operation of the instant invention.
Figure 2:
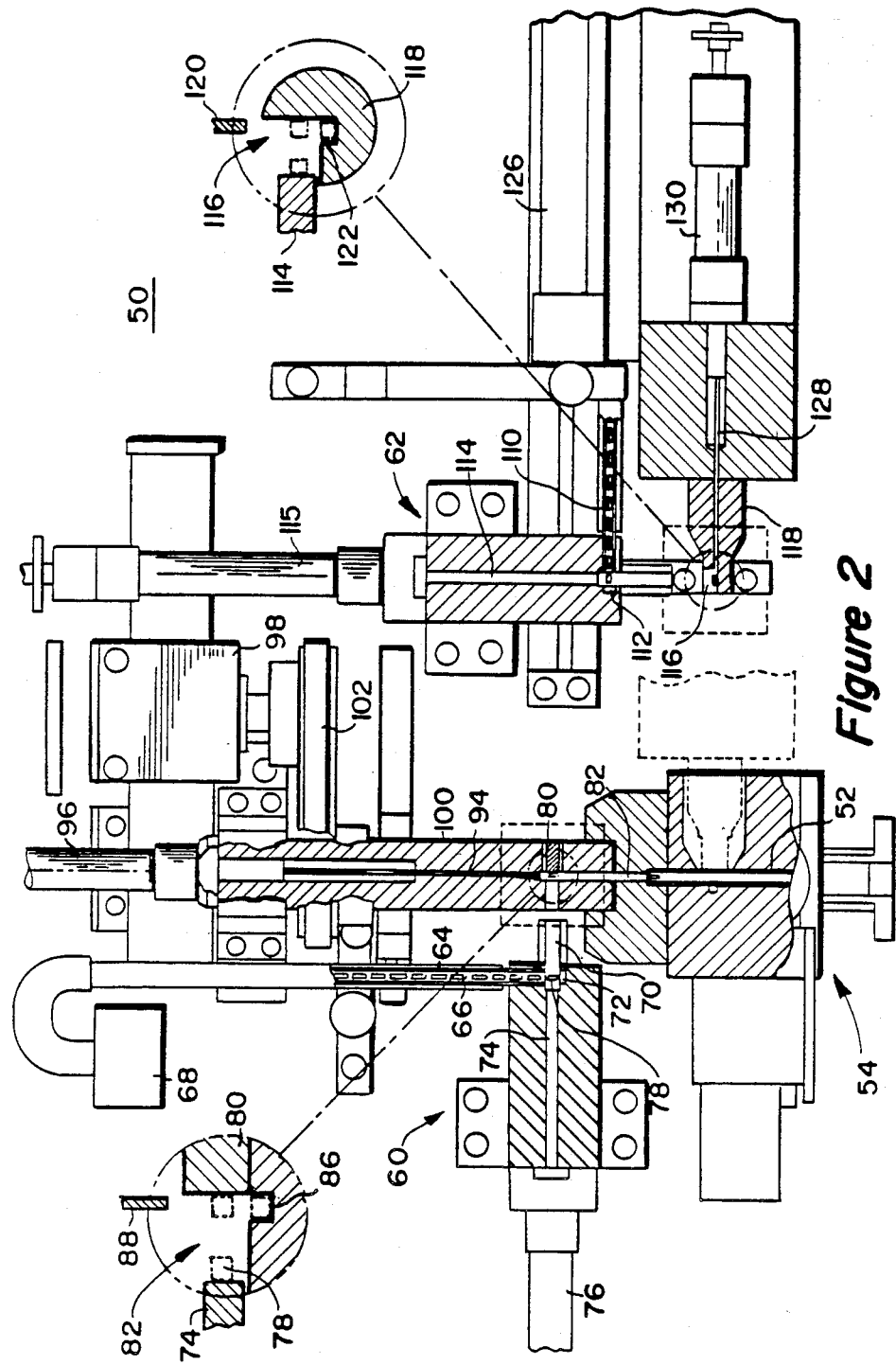
FIG. 2 represents a selectively cross-sectioned, plan view of the subject apparatus for inserting the armstretcher and skipper magnets into the stylus arm.
Figure 3:
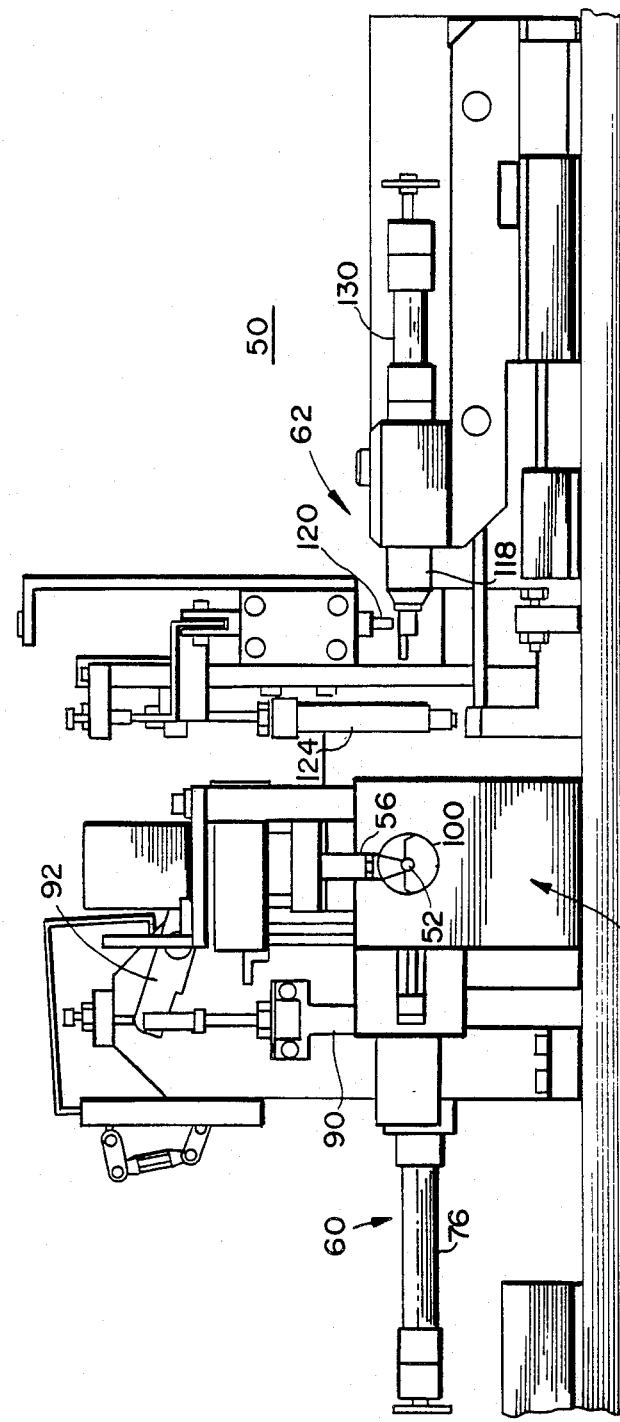
FIG. 3 depicts a front view of the magnet insertion apparatus of FIG. 4.

As previously indicated, the assembly of the stylus holder 12 and the respective magnets 16 and 18 to the stylus arm 10 is very difficult due to fine dimensions of the parts involved. In accordance with this invention, an apparatus 50, shown in FIGS. 2–4, is provided for performing these assembly functions at a high rate of output and yield.

The stylus holder 12 is pushed into the stylus arm 10 and the stylus arm assembly 52 is, in turn, inserted into a loading station 54. When the insertion machine 50 is actuated, a reciprocably-mounted plunger 56, indicated in FIG. 3, is lowered (1) to securely hold the stylus arm assembly 52 in place, (2) to stake the stylus holder 12 to the stylus arm 10, (3) to pierce a hole 58 at the back end of the stylus arm for the orthogonal kicker magnet 18, and (4) to punch two perforations 20 and 22 into the stylus arm for providing an interference fit with the axial transducer magnet 16. The stylus arm assembly 52 is then rotated 90° so that the axis of the aperture 58 in the stylus arm 10 is horizontal in order to ready the stylus arm assembly for receiving the two magnet 16 and 18.

The insertion machine 50 is further provided with a pair of magnet insertion stations 60 and 62 for installing the armstretcher and skipper magnets 16 and 18, respectively, to the stylus arm 10. The axial magnet insertion station 60 includes a plastic tube 64 defining a first passageway through which the magnets, indicated at 66, are fed forward in the manner depicted in FIGS. 2 and 4. The back end of the plastic tube 64 is connected to a supply 68 of pressurized air to urge the magnets forward.

Arranged substantially at right angles to the first passageway defined by the plastic tube 64 is a second passageway formed by a channel 70 in the housing of the insertion machine 50. The channel 70 is fitted with a steel insert 72 against which the magnets are fed one at a time. The steel insert 72 serves to accurately position the leading magnet 78 in respect of the second passageway 70. Reciprocably mounted in the second passageway 70 is a transfer element 74, which is selectively advanced by an air cylinder 76 to transport the leading magnet 78 to a position against another steel insert 80 in a third passageway defined by a further channel 82 in the housing of the insertion machine 50. The third passageway is disposed substantially at right angles to the second passageway, and arranged substantially parallel to and spaced from the first passageway in the manner portrayed in the plan view given in FIG. 2.

The dimension of the leading edge of the transport element 74 is slightly smaller than the length of the magnets, so that when the transfer element is advanced, it displaces the magnet 78 to a position in the third passageway, while holding back the next magnet 84 in the first passageway.

The third passageway formed by the channel 82 is provided with a guideway 86. The steel insert 80 provides a reference surface to accurately orient and position the magnets in relation to the guideway 84 of the third passageway. The insertion machine 50 is additionally equipped with a reciprocably-mounted locating element 88 to accurately tuck the magnets into the guideway 86. The tucking element 88 is activated by an air cylinder 90 through a linkage means 92 shown in FIG. 3. The loading station 54 serves to locate the stylus arm assembly 52 such that the center line of the guideway 86 is in alignment with the axis of the stylus arm 10.

The third passageway defined by the trench 82 is equipped with a reciprocably-mounted drive element 94, which is coupled to an air cylinder 96. When the drive element 94 is advanced, it pushes the magnet in the guideway 86 into the stylus arm 10. As previously indicated, the stylus arm 10 is lanced to provide the depressions 20 and 22 to lock the transducer magnet 16 in place. The dimensions of the guideway 86 are slightly larger than the cross-section of the magnets to allow relatively free passage of the magnets therethrough.

The insertion machine 50 is further equipped with a pneumatically-operated rotary actuator 98, which is coupled to a rotatably-mounted assembly 100 by means of a belt 102. The rotatable assembly 100 houses the mounting means for the stylus arm 10, the third passageway 82, the reciprocably-mouhted drive element 94, and the air cylinder 96. When the rotary actuator 98 is operated, the entire rotatably-mounted assembly 100 is rotated.

The insertion station 62 serves to insert the perpendicular skipper magnet 18 into a hole 58 in the stylus arm 10. The skipper magnets, in a plastic tube 110, are urged against a steel insert 112 by means of pressurized air. A reciprocably-mounted element 114, coupled to an air cylinder 115, transports the leading magnet resting against the steel insert 112 to a position against another steel insert located in a passageway 116 provided in a chuck assembly 118. A reciprocably-mounted tucking element 120, connected to an air cylinder 124, accurately positions the skipper magnets into a guideway 122 located in the chuck assembly 118. The transport and tucking elements 114 and 120 are then withdrawn, and the chuck assembly 118 is advanced by an air cylinder 126 to a position shown in phantom in FIG. 2 such that the leading edge of the chuck juts against the stylus arm assembly 52, and the guideway 122 is in registration with the hole 58 in the stylus arm 10. A reciprocably-mounted drive element 128, coupled to an air cylinder 130, is advanced to press fit the skipper magnet in the guideway 122 into the hole 58 in the stylus arm 10. The chuck assembly 118 is withdrawn and the completed stylus arm assembly is kicked out into a tray for subsequent pickup.

To recapitulate, the chronology of operations is as follows:

The stylus holder 12 is inserted into the stylus arm tube 10, the holder/stylus assembly is loaded into the insertion machine 50, and the machine is activated.

The plunger 56 is actuated to crimp the stylus holder 12 in place, to punch a hole 58 for the skipper magnet 18, and to lance two perforations 20 and 22 in the stylus arm 10.

The transport elements 74 and 114 are operated to transfer the armstretcher and skipper magnets 16 and 18 to the respective passageways.

The tucking elements 88 and 120 are energized to tuck the armstretcher and skipper magnets 16 and 18 into the respective guideways 86 and 122.

The transport elements 74, 114 and the tucking elements 88 and 120 are removed out of the way.

The rotatably-mounted shaft assembly 100 is then rotated to line up the hole 58 in the stylus arm 10 with the guideway 122.

The air cylinder 126 is actuated to advance the chuck assembly 118 to a position against the stylus arm 10 as shown in phantom in FIG. 2.

The pusher rods 94 and 128 are then advanced to respectively insert the armstretcher and skipper magnets 16 and 18 into the stylus arm 10.

The pusher rods 94 and 128 are retracted.

The chuck assembly 118 is withdrawn.

The stylus arm assembly 52 is ejected out into a tray.

The rotatably-mounted shaft assembly 100 is then returned to its original position to ready the insertion machine for the next cycle.

The plastic tubes 64 and 110 are made from Teflon. All the passageways are made from stainless steel. The transport blades 74 and 114 are made from brass, but are provided with steel inserts, in the manner indicated at 132 in FIG. 4, to make sure that the magnets remain properly oriented as they are transported. The tucking elements 88 and 120 are made from brass to prevent the magnets from sticking to the tucking elements. The drive rods 94 and 128 are made from steel.

The insertion machine utilizes a number of air cylinders, which are automatically sequenced to carry out the various activities in proper order. The air cylinder specifications are as follows:

Transport the armstretcher and kicker magnets to load positions—Cylinders 76 and 115: Bimba, Model No. 01-2-DXDE, Tuck the armstretcher and kicker magnets into the respective guideways—Cylinders 90 and 124: Bimba, Model No. 01-1-D, Insert the armstretcher magnet into the stylus arm—Cylinder 96: Bimba, Model No. 01-2-DXDE, Insert the kicker magnet into the stylus arm—Cylinder 130: Bimba, Model No. 01-½-DXDE, Stake the stylus holder to the stylus arm and lance the stylus arm for magnets—Loading station 54: Fabco, Model No. E-121, Rotate the stylus arm assembly—Air actuator 98: PHD, Model No. R21A-110-D1-D2, Advance the kicker assembly station—Cylinder 126: Clippard, Model No. #9-BDD, Stroke—4 inches, and Eject finished stylus arm assembly—Loading station 54: Fabco, Model No. G-5-B4.

The subject insertion machine 50 stakes the stylus holder 12 to the stylus arm 10 and installs the transducer and kicker magnets to the stylus arm at high rates of output and efficiency.

What is claimed is:

1. An article insertion apparatus comprising:
    (A) a first passageway along which articles are fed one at a time;
    (B) a second passageway in communication with said first passageway and having an abutment surface against which said articles in said first passageway are sequentially fed;
    (C) a third passageway substantially parallel to and spaced from said first passageway; said third passageway having a reference surface to which said articles are consecutively presented;
    (D) means for selectively mounting a workpiece in alignment with said third passageway;
    (E) a transfer element reciprocably mounted in said second passageway; said transfer element, when advanced, displacing an article in engagement with said abutment surface in said second passageway to a position against said reference surface in said third passageway, while preventing the next article in said first passageway from entering into said second passageway; said transfer element, upon withdrawal, allowing said next article in said first passageway to come into engagement with said abutment surface in said second passageway; and
    (F) a drive element reciprocably mounted in said third passageway for inserting an article in said third passageway into said workpiece.

2. The insertion apparatus as defined in claim 1 wherein said third passageway is fitted with a guideway for guiding said articles; said insertion apparatus further including means for accurately positioning said articles in said guideway.

3. The insertion apparatus as defined in claim 2 wherein said positioning means comprises a reciprocably-mounted locating element.

4. The insertion apparatus as defined in claim 3 wherein said locating element of said positioning means is pneumatically actuated.

5. The insertion apparatus as defined in claim 3 wherein said articles are permanent magnets; wherein said locating element is non-magnetic to prevent said magnets from adhering to said locating element.

6. The insertion apparatus as defined in claim 1 wherein said articles are permanent magnets.

7. The insertion apparatus as set forth in claim 6 wherein said permanent magnets are elongated.

8. The insertion apparatus of claim 7 wherein said elongated permanent magnets have a substantially square cross-section.

9. The insertion apparatus as defined in claim 6 wherein said abutment surface in said second passageway has magnetic properties to properly position said permanent magnets in relation to said second passageway.

10. The insertion apparatus as set forth in claim 9 wherein said reference surface of said third passageway is made from magnetic material to assure proper orientation of said permanent magnets in respect of said guideways.

11. The insertion apparatus of claim 10 wherein said transfer and drive elements have magnetic properties so that said permanent magnets continue to remain properly located during transfer and insertion operations.

12. The insertion apparatus as defined in claim 8 wherein said workpiece is a tubular stylus arm; wherein said mounting means supports said stylus arm such that the axes of said tubular stylus arm and said third passageway are in registration, whereby when said drive element is advanced, a magnet in said third passageway is axially inserted into said tubular stylus arm.

13. The insertion apparatus as set forth in claim 8 wherein said workpiece is an elongated stylus arm; said elongated stylus arm having an aperture disposed substantially orthogonally to its axis; wherein said mounting means supports said stylus arm such that the axis of said aperture in said stylus arm is in alignment with said third passageway so that said drive element inserts a permanent magnet held in said third passageway into said aperture substantially at right angles to the axis of said elongated stylus arm.

14. The insertion apparatus as set forth in claim 1 wherein said second passageway is substantially perpendicular to said first passageway.

15. The insertion apparatus of claim 14 wherein said third passageway is substantially orthogonal to said second passageway, and parallel to, and offset from, said first passageway.

16. The insertion apparatus as defined in claim 15 where the axes of said passageways are substantially coplanar.

17. The insertion apparatus as set forth in claim 1 further including means for urging said articles in said first passageway toward said abutment surface in said second passageway; said urging means comprising a source of pressurized air in communication with said first passageway.

18. The insertion apparatus of claim 1 further having a pair of selectively-actuated air cylinders respectively coupled to said transfer and drive elements.

19. The insertion apparatus as defined in claim 1 wherein the dimension of the leading edge of said transfer element being slightly smaller than the dimension of said articles in the direction of said first passageway so that when said transfer element is advanced, it displaces the article resting against said abutment surface to a position against said reference surface of said third passageway.

20. The insertion apparatus as defined in claim 1 wherein said passageways are made from non-magnetic material.

* * * * *